United States Patent
Bhagath

(10) Patent No.: US 9,144,851 B2
(45) Date of Patent: Sep. 29, 2015

(54) CUTTING INSERT AND CUTTING TOOL

(71) Applicant: TUNGALOY CORPORATION, Iwaki-shi, Fukushima (JP)

(72) Inventor: Kedar Suresh Bhagath, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 280 days.

(21) Appl. No.: 13/757,847

(22) Filed: Feb. 3, 2013

(65) Prior Publication Data

US 2013/0149053 A1  Jun. 13, 2013

Related U.S. Application Data

(63) Continuation-in-part of application No. PCT/JP2012/061138, filed on Apr. 25, 2012.

(30) Foreign Application Priority Data

Apr. 26, 2011  (JP) .................. 2011-097948

(51) Int. Cl.
*B23C 5/08* (2006.01)
*B23C 5/20* (2006.01)

(52) U.S. Cl.
CPC . *B23C 5/207* (2013.01); *B23C 5/08* (2013.01); *B23C 5/205* (2013.01);
(Continued)

(58) Field of Classification Search
CPC .................. B23C 2200/367; B23C 2220/36; B23C 5/207; B23C 2200/0494; B23C 2200/0416; B23C 5/08; B23C 5/20; Y10T 407/235; Y10T 407/1932; Y10T 407/2268
USPC ............ 407/34, 51, 61, 46, 53, 113, 102, 103
See application file for complete search history.

(56) References Cited

U.S. PATENT DOCUMENTS 5,454,671 A * 10/1995 Qvarth ............................ 407/42
5,529,440 A *  6/1996 Schmidt ........................ 407/113

(Continued)

FOREIGN PATENT DOCUMENTS

DE          19520058 A1   12/1996
JP         2001-038517     2/2001

(Continued)

OTHER PUBLICATIONS

International Preliminary Report on Patentability (IPRP) dated Nov. 7, 2013 issued in PCT counterpart application (PCT/JP2012/061138).

(Continued)

*Primary Examiner* — Sunil K Singh
*Assistant Examiner* — Sara Addisu
(74) *Attorney, Agent, or Firm* — Womble Carlyle

(57) ABSTRACT

A cutting insert according to an aspect of the present invention is provided with two opposite first surfaces, and a peripheral surface extending between the two first surfaces. A first cutting edge is formed on an edge of one first surface of the two first surfaces. A rake surface associated with the first cutting edge extends on the one first surface. A second cutting edge is formed on an edge of one second surface of two opposite second surfaces in the peripheral surface. A rake surface associated with the second cutting edge extends on the one second surface. The second cutting edge has a different function from the first cutting edge.

17 Claims, 11 Drawing Sheets

(52) U.S. Cl.
CPC .......... *B23C 2200/0416* (2013.01); *B23C 2200/0494* (2013.01); *B23C 2200/367* (2013.01); *B23C 2220/36* (2013.01); *Y10T 407/1942* (2015.01); *Y10T 407/2268* (2015.01); *Y10T 407/235* (2015.01)

(56) References Cited

U.S. PATENT DOCUMENTS

| | | | |
|---|---|---|---|
| 6,238,146 B1* | 5/2001 | Satran et al. | 407/113 |
| 6,872,034 B2* | 3/2005 | Satran et al. | 407/113 |
| 7,097,393 B2* | 8/2006 | Satran et al. | 407/113 |
| 7,367,755 B2* | 5/2008 | Wurfels et al. | 407/113 |
| 7,544,022 B2* | 6/2009 | Jang et al. | 407/66 |
| 7,553,112 B1* | 6/2009 | Hecht et al. | 407/113 |
| 7,775,750 B2* | 8/2010 | Satran et al. | 407/113 |
| 8,202,026 B2* | 6/2012 | Satran et al. | 407/113 |
| 8,348,558 B2* | 1/2013 | Bar et al. | 407/113 |
| 8,702,353 B2* | 4/2014 | Chen et al. | 407/113 |
| 8,734,064 B2* | 5/2014 | Koontz | 407/113 |
| 8,814,479 B2* | 8/2014 | Kaufmann | 407/102 |
| 8,834,075 B2* | 9/2014 | Choi et al. | 407/113 |
| 8,845,241 B2* | 9/2014 | Abe | 407/54 |
| 2003/0002930 A1* | 1/2003 | Eisen et al. | 407/70 |
| 2003/0113175 A1* | 6/2003 | Wermeister | 407/113 |
| 2003/0165363 A1* | 9/2003 | Wermeister | 407/115 |
| 2003/0215294 A1* | 11/2003 | Wermeister et al. | 407/113 |
| 2005/0117981 A1 | 6/2005 | Satran et al. | |
| 2007/0071561 A1* | 3/2007 | Agic | 407/34 |
| 2008/0226403 A1* | 9/2008 | Craig | 407/113 |
| 2009/0155004 A1* | 6/2009 | Jansson | 407/40 |
| 2011/0052337 A1* | 3/2011 | Dudzinsky et al. | 407/40 |
| 2012/0308317 A1* | 12/2012 | Choi et al. | 407/47 |
| 2013/0266392 A1* | 10/2013 | Lee | 409/234 |
| 2014/0298967 A1* | 10/2014 | Ishi | 83/13 |

FOREIGN PATENT DOCUMENTS

| | | |
|---|---|---|
| JP | 2009-95894 A | 5/2009 |
| WO | WO 00/02693 | 1/2000 |

OTHER PUBLICATIONS

International Search Report dated May 22, 2012 issued in PCT counterpart application (No. PCT/JP2012/061138).
Extended search report issued on Aug. 29, 2014 in European counterpart application (No. 12775994.2).

* cited by examiner

CUTTING INSERT AND CUTTING TOOL

CROSS-REFERENCE TO RELATED APPLICATIONS

This application is a continuation-in-part PCT application No. PCT/JP2012/061138 filed Apr. 25, 2012 and published as WO 2012/147816A1, which claims the benefit of Japanese Patent Application No. 2011-097948, filed Apr. 26, 2011. The contents of the aforementioned applications are incorporated by reference in their entirety.

BACKGROUND OF THE INVENTION

1. Field of the Invention

The present invention relates to a cutting insert detachably mounted on an indexable cutting tool body, and a cutting tool which can detachably mount the cutting insert.

2. Description of the Related Art

Conventionally, for example, there are some cases where in a groove formed by processing using a rotary cutting tool, finishing processing is performed to side wall surfaces at both sides of the groove. For performing such two kinds of processing, that is, roughing processing and finishing processing of the groove, two kinds of rotary cutting tools are generally used. In addition, in a case of performing such two kinds of processing by using a single rotary cutting tool alone, two or more of processing processes shifted in processing positions are required. For such two kinds of processing, conventionally two rotary cutting tools each having a different processing width for roughing processing and finishing processing of the groove are used or for performing the finishing processing by a single rotary cutting tool used in the roughing processing of the groove, the single rotary cutting tool is moved relatively to a side wall surface of the groove after the roughing processing.

For example, Japanese Patent Laid-Open No. 2001-38517 shows an example of a conventional cutting insert and rotary cutting tool which can perform groove processing. Japanese Patent Laid-Open No. 2001-38517 discloses a side cutter as the rotary cutting tool applied to the groove processing. The cutting insert used in the rotary cutting tool is formed in a substantially rectangular plate shape, and includes an upper surface and a lower surface as two opposite surfaces, each having a rectangular shape, and outer side surfaces each having a trapezoidal shape. The cutting insert is formed in such a manner that a pair of outer side surfaces among the four outer side surfaces form rake surfaces, and the other pair of outer side surfaces and the upper surface form relief surfaces. A cutting edge is formed in the edge of the outer side surface as the rake surface. The cutting insert having such a shape is mounted on each of insert mounting seats alternately formed in both end surface sides of the tool main body, that is, the tool body by a screw penetrating through the upper and lower surfaces to use the lower surface as a seating surface. That is, since the cutting insert has a cutting edge in the right side and a cutting edge in the left side as the insert is viewed from the edge tip thereof, the cutting insert is a right hand insert, as well as a left hand insert.

The cutting insert disclosed in Japanese Patent Laid-Open No. 2001-38517 has the right-side cutting edge and the left-side cutting edge, as described above. However, these cutting edges are cutting edges used for the same kind of processing. Therefore in the cutting insert and the cutting tool disclosed in Japanese Patent Laid-Open No. 2001-38517, a plurality of cutting tools are still required or a plurality of processing processes by a single cutting tool are still required to perform roughing processing and finishing processing of the groove.

SUMMARY OF THE INVENTION

The present invention is made in view of the foregoing problems, and an object of the present invention is to provide a cutting insert which enables two kinds of processing to be efficiently performed, and a cutting tool on which the cutting insert is detachably mounted.

According to an aspect of the present invention, there is provided a cutting insert formed in a plate shape, comprising: two opposite first surfaces; a peripheral surface extending between the two first surfaces, the peripheral surface having two opposite second surfaces; a first cutting edge formed on an edge of one first surface of the two first surfaces, a rake surface associated with the first cutting edge extending on the one first surface, and a second cutting edge formed on an edge of one second surface of the two second surfaces, a rake surface associated with the second cutting edge extending on the one second surface, wherein the second cutting edge has a different function from the first cutting edge. Since the first cutting edge and the second cutting edge are formed in this way, the cutting insert according to the aspect of the present invention can be used suitably for at least two kinds of processing. Therefore two kinds of processing can be efficiently performed by using this cutting insert, that is, without another kind of cutting insert. It should be noted that the first cutting edge and the second cutting edge have different functions, and therefore can act independently, can be used independently with each other, and are preferably different in an application.

Preferably the first cutting edge is formed to extend along a corner portion in each of the two first surfaces, and the second cutting edge is formed to extend to either one of the two first surfaces in each of the two second surfaces.

Preferably a part of the first cutting edge extends on a straight intersection ridge portion between the first surface and the second surface. In this case, when defining a first median plane extending medianly between the two first surfaces to substantially bisect the cutting insert and defining a second median plane extending medianly between the two second surfaces to substantially bisect the cutting insert, which is perpendicular to the first median plane, the second cutting edge may extend between the second median plane and a plane defined to be along the straight intersection ridge portion and perpendicular to the first median plane. Configuring the cutting insert in this manner can prevent the second cutting edge from projecting so as to interrupt an operation of the first cutting edge when the first cutting edge is being used.

Preferably when defining a first median plane extending medianly between the two first surfaces to substantially bisect the cutting insert, a portion of the second cutting edge which is most separated from the first median plane may be positioned more distantly from the first median plane than a corner of the first cutting edge in a direction perpendicular to the first median plane. This configuration can prevent the first cutting edge from projecting so as to interrupt an operation of the second cutting edge when the second cutting edge is being used.

Preferably a length of the first cutting edge on an intersection ridge portion between the first surface and the second surface may be longer than a half of a length of the intersection ridge portion between the first surface and the second surface. This configuration can enhance a processing efficiency of the first cutting edge.

Preferably when defining a first median plane extending medianly between the two first surfaces to substantially bisect the cutting insert, the first cutting edge may have a corner and a portion which extends to approach the first median plane gradually as the distance from the corner increases. Adopting this configuration makes it easy to form a positive inclination related to the first cutting edge.

According to an embodiment, in one of the two second surfaces, the second cutting edge extending to one of the two first surfaces and the second cutting edge extending to the other of the two first surfaces may be integrated. Adopting this configuration enables a substantial length of the second cutting edge to be maximized.

According to an embodiment, each of the two first surfaces has a substantially quadrilateral shape, and the cutting insert has, in the peripheral surface, two opposite third surfaces in addition to the two second surfaces, wherein a relief surface associated with the first cutting edge may extend at least on the second surface, and a relief surface associated with the second cutting edge may extend at least on the third surface.

According to an embodiment, a plurality of first cutting edges can be formed in each of the two first surfaces, a plurality of second cutting edges can be formed in each of the two second surfaces, and when defining a first median plane extending medianly between the two first surfaces to substantially bisect the cutting insert, and defining a second median plane which is perpendicular to the first median plane and which extends medianly between the two second surfaces to substantially bisect the cutting insert, the plurality of first cutting edges can be formed to have planar symmetry with respect to the first median plane and to have planar symmetry with respect to the second median plane and the plurality of second cutting edges can be formed to have planar symmetry with respect to the first median plane and to have planar symmetry with respect to the second median plane. In addition, according to another different embodiment, a plurality of first cutting edges can be formed in each of the two first surfaces, a plurality of second cutting edges can be formed in each of the two second surfaces, and when defining a first median plane extending medianly between the two first surfaces to substantially bisect the cutting insert, and defining first axis which is perpendicular to the first median plane and which extends to pass through the two first surfaces, the plurality of first cutting edges in each first surface can be formed to have rotation symmetry about the first axis and the plurality of second cutting edges can be formed to have rotation symmetry about the first axis.

According to another aspect of the present invention, there is provided a cutting tool comprising a tool body, and an insert mounting seat formed in the tool body such that the cutting insert as described above is detachably mounted on the insert mounting seat. Preferably the cutting tool comprises a first insert mounting seat and a second insert mounting seat to mount the two or more cutting inserts in at least two forms, wherein the first insert mounting seat is formed such that the cutting insert is mounted to use the first cutting edge of the cutting insert, and the second insert mounting seat is formed such that the cutting insert is mounted to use the second cutting edge of the cutting insert. According to an embodiment, the cutting tool can be a rotary cutting tool for grooving, and comprise a first insert mounting seat and a second insert mounting seat to mount the two or more cutting inserts in at least two forms, wherein the first insert mounting seat can be formed such that the cutting insert is mounted to face one of the two first surfaces of the cutting insert forwardly in a rotation direction of the tool and use the first cutting edge, and the second insert mounting seat can be formed such that the cutting insert is mounted to face one of the two first surfaces of the cutting insert toward a direction substantially perpendicular to the rotation direction of the tool and use the second cutting edge.

Further features of the present invention will become apparent from the following description of exemplary embodiments (with reference to the attached drawings).

DETAILED DESCRIPTION

Figure 1:
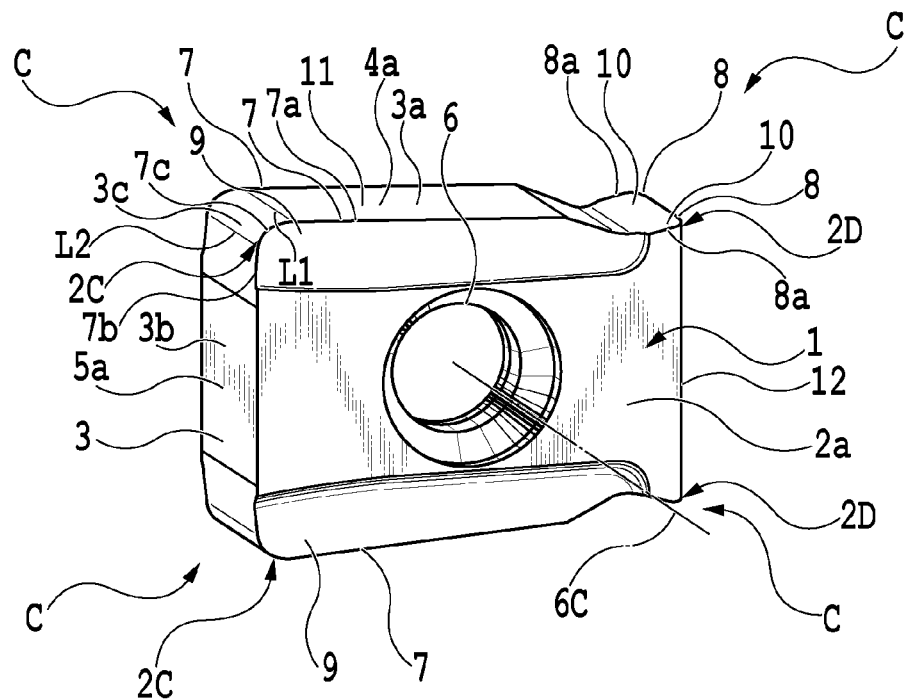
FIG. 1 is a perspective view of a cutting insert according to a first embodiment.
Figure 11:
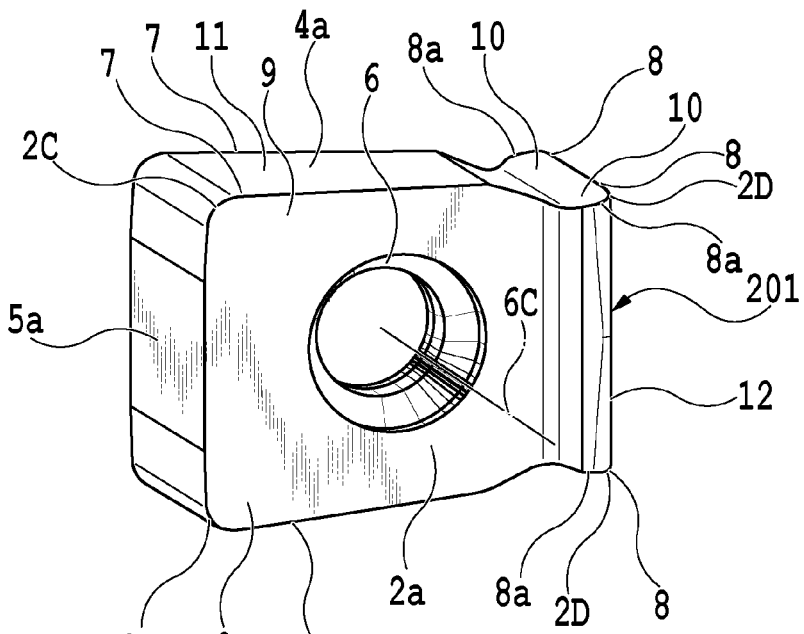
FIG. 11 is a perspective view of a cutting insert according to a third embodiment.
Figure 12:
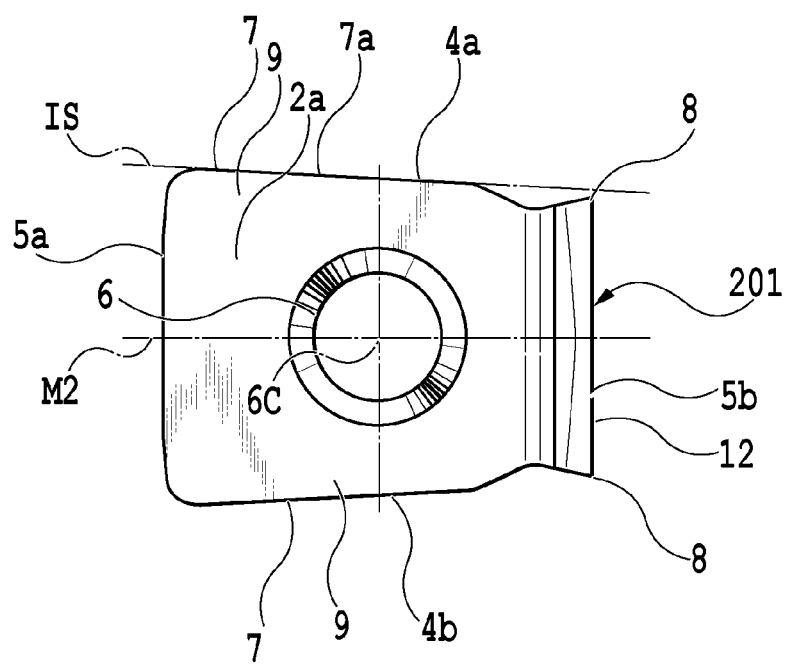
FIG. 12 is a plan view of the cutting insert shown in FIG. 11.
Figure 13:
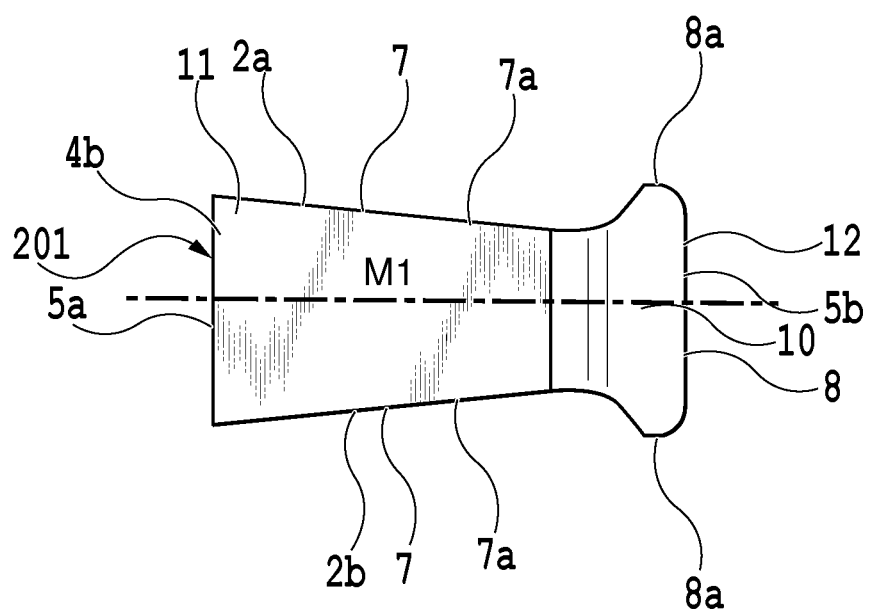
FIG. 13 is a front view of the cutting insert shown in FIG. 11.
Figure 14:
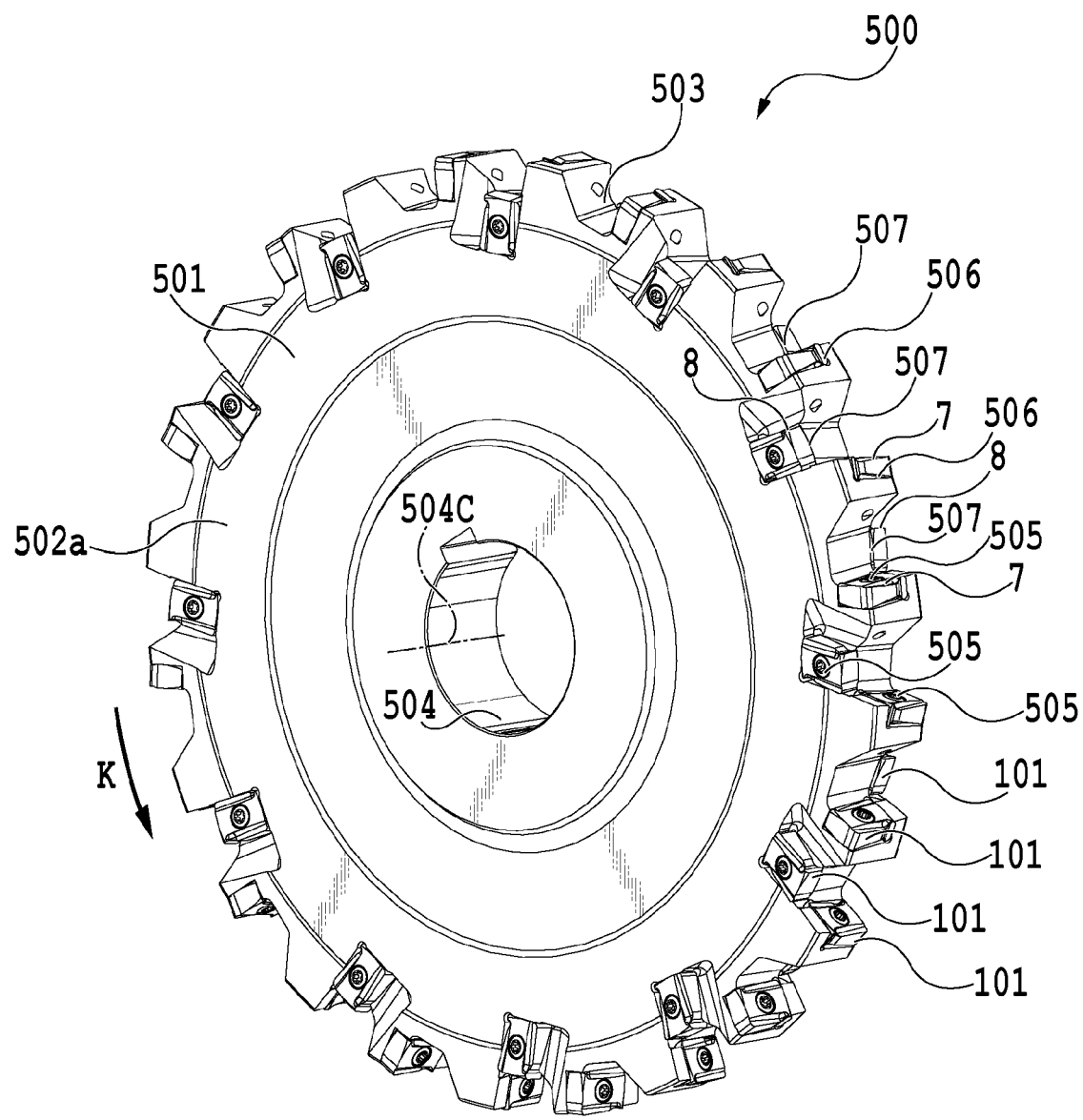
FIG. 14 is a perspective view in an embodiment of a rotary cutting tool on which the cutting inserts according to the second embodiment are mounted.
Figure 15:
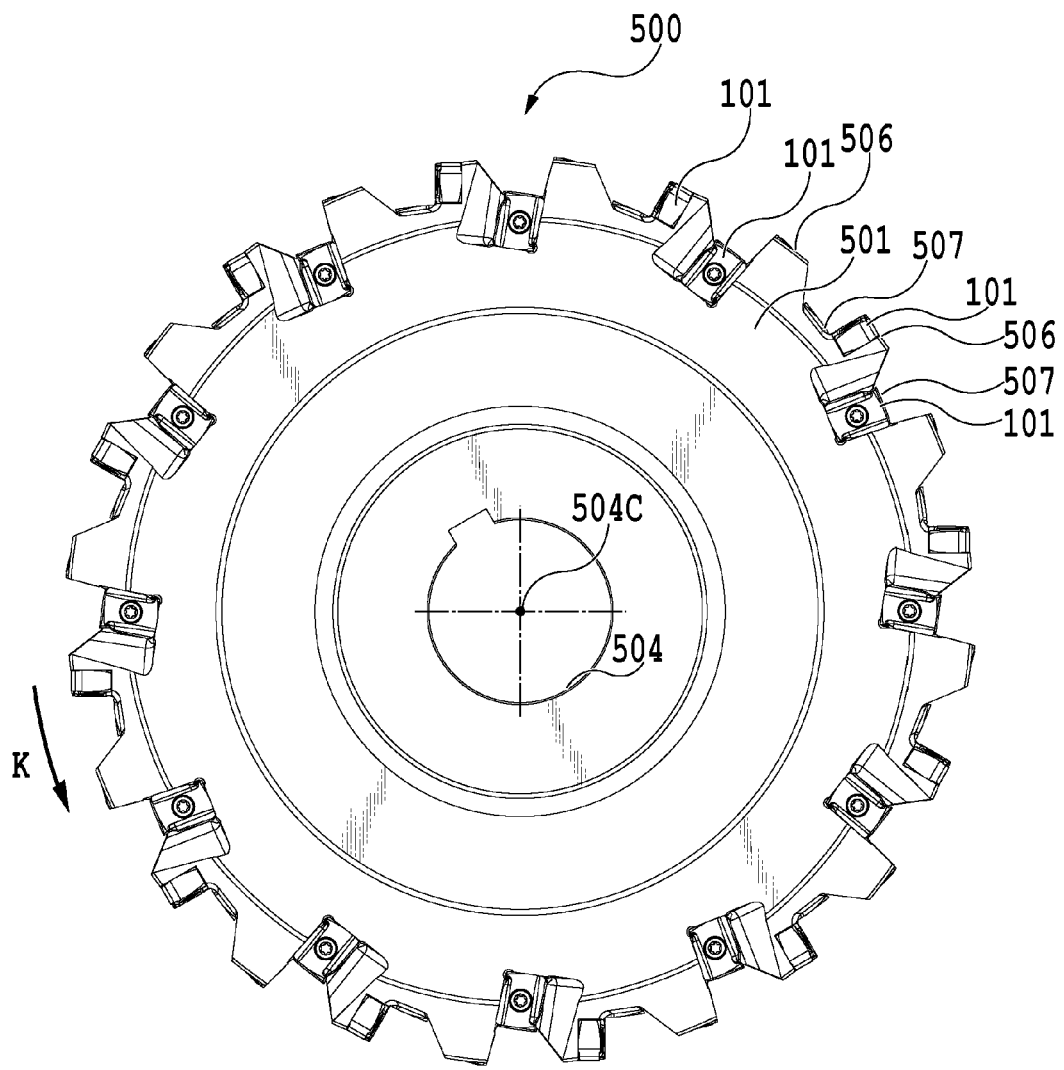
FIG. 15 is a front view of the rotary cutting tool shown in FIG. 14.
Figure 16:
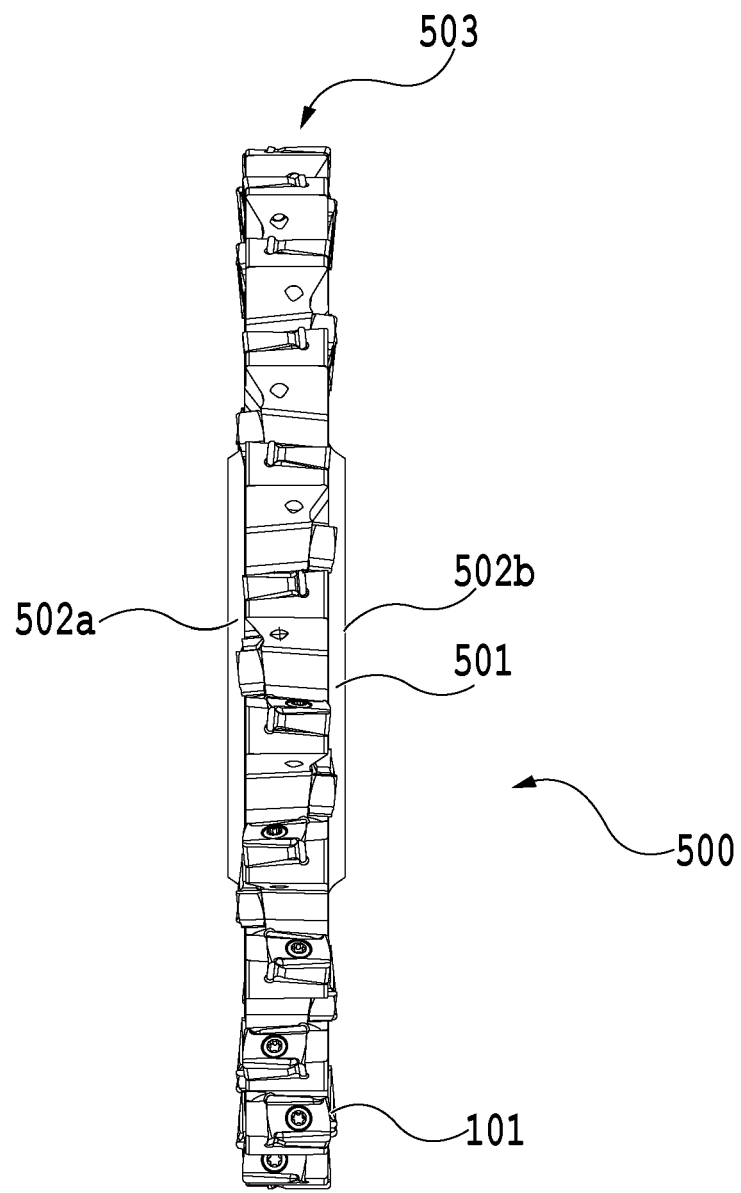
FIG. 16 is a right side view of the rotary cutting tool shown in FIG. 14.

An explanation will be made of embodiments in the present invention with reference to the drawings. FIG. 1 is a perspective view of a cutting insert according to a first embodiment in the present invention. FIG. 2 to FIG. 5 are a plan view, a front view (or a bottom view), a right side view, and a left side view of the cutting insert shown in FIG. 1. FIG. 6 is a perspective view of a cutting insert according to a second embodiment in the present invention. FIG. 7 to FIG. 10 are a plan view, a front view, a right side view, and a left side view of the cutting insert shown in FIG. 6. FIG. 11 is a perspective view of a cutting insert according to a third embodiment in the present invention. FIG. 12 and FIG. 13 are a plan view and a front view of the cutting insert shown in FIG. 11. FIG. 14 is a view showing a cutting tool according to an embodiment in the present invention, and particularly, is a perspective view of a rotary cutting tool on which the cutting inserts according to the second embodiment are mounted. FIG. 15 and FIG. 16 are a front view and a right side view of the rotary cutting tool shown in FIG. 14.

First, a cutting insert 1 according to a first embodiment in the present invention will be explained with reference to the drawings.

Figure 2:
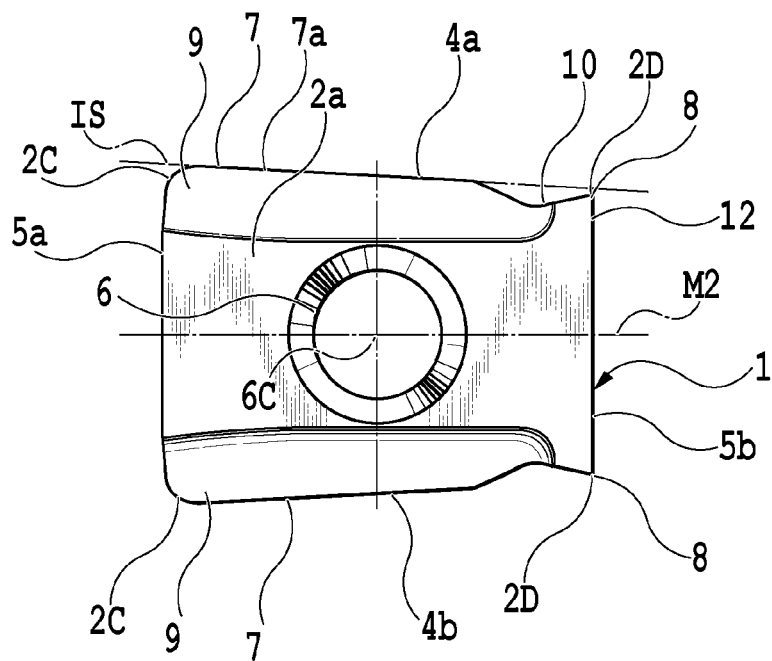
FIG. 2 is a plan view of the cutting insert shown in FIG. 1.

The cutting insert 1 according to the first embodiment is, as shown in FIG. 1 to FIG. 5, formed in a substantially quadrangular plate shape. As shown in FIG. 2, the cutting insert 1 in the first embodiment is formed in a substantially trapezoidal plate shape. The cutting insert in the present invention is not limited to such a shape, but can be formed in various kinds of shapes. For example, the cutting insert in the present invention can be formed in a substantially polygonal plate shape, such as a substantially rectangular plate shape and a substantial parallelogram plate shape. It should be noted that the cutting insert to be exemplified herein is illustrated in a substantially quadrangular plate shape by ignoring a contour portion by a shape of a rake surface to be described later. No matter how complicated the shape of the rake surface may be, the shape of the rake surface is not necessarily in agreement with a contour of a substantial quadrangle of the cutting insert. Not limited to any polygon, the cutting insert according to the present invention can be formed in various kinds of plate shapes.

Back to the explanation of the cutting insert 1 in the first embodiment, the cutting insert 1 in the first embodiment comprises first surfaces 2a and 2b as two opposing or opposite end surfaces, and a peripheral surface 3 extending therebetween. Each of the first surfaces 2a and 2b is formed in a substantially quadrangular shape to have four corners 2C and 2D, particularly in a substantially trapezoidal shape. The peripheral surface or peripheral side surface 3 of the cutting insert 1 has substantially four surfaces, and each of the four surfaces is connected to the two first surfaces. The peripheral surface 3 has two opposite second surfaces 4a and 4b, and two opposite third surfaces 5a and 5b. The second surfaces and the third surfaces are different surfaces, connect to each other and are alternately continued. In this application, the opposite first surfaces 2a may be referred to as either "end surfaces" or "main surfaces"; the opposite second surfaces 4a, 4b may be referred to as "long side surfaces"; and the opposite third side surfaces 5a, 5b may be referred to as "short side surfaces". The cutting insert 1 has a mounting hole 6 formed to penetrate through the first surfaces 2a and 2b. It should be noted that the mounting hole 6 is formed in such a manner that a screw for mounting the cutting insert 1 to the tool body passes therethrough. In this way, the first surfaces 2a and 2b are formed to have the mounting hole 6.

Here, a plane extending medianly between the two first surfaces 2a and 2b to bisect the cutting insert 1 is defined as a first median plane M1. It should be noted that herein the first median plane M1 is perpendicular to a center axis 6C of the mounting hole 6. That is, the center axis 6C is a first axis which is perpendicular to the first median plane M1 and extends to penetrate through the two first surfaces 2a and 2b. In addition, a plane perpendicular to the first median plane M1 and extending to substantially bisect the cutting insert 1 is defined as a second median plane M2. The second median plane M2 is defined to extend medianly between the second surfaces 4a and 4b. The cutting insert 1 in the first embodiment is formed to have planar symmetry with respect to the first median plane M1 and is formed to have planar symmetry with respect to the second median plane M2.

In the cutting insert 1 in the present embodiment, the substantial trapezoidal shape of the first surfaces 2a, 2b is formed by a long trapezoid base 5a, a short trapezoid top 5b, and the two trapezoid side surfaces 4a and 4b. The length of the long trapezoid base 5a of each of the first surfaces 2a and 2b is set to approximately 15.00 mm. A height of the substantial trapezoid (between the short side surfaces 5a and 5b) is set to approximately 17.00 mm. A thickness between the first surfaces 2a and 2b, that is, a thickness of the cutting insert 1 is set to approximately 7.94 mm. It should be noted that the length of the longer side and the height of the trapezoid of each of the first surfaces 2a and 2b may be the same. These dimensions can be adjusted as needed corresponding to a shape of a workpiece to be processed or a size of a cutting tool.

Two kinds of cutting edges are formed in the cutting insert 1 having such a profile. Among these two kinds of cutting edges, the cutting edges formed mainly associated with the first surfaces are defined as first cutting edges 7, and the cutting edges formed mainly associated with the peripheral surface 3 are defined as second cutting edges 8. The first cutting edges 7 are formed in the edges or the side ridge portions of the first surfaces 2a and 2b. On the other hand, the second cutting edges 8 are formed to mainly extend on the peripheral surface 3. Particularly in the cutting insert 1, the second cutting edges 8 are formed to extend in the edges or the side ridge portions of the second surfaces 4a and 4b, and more specifically, are formed to extend mainly at the intersection portions or the intersection ridge portions between the second surfaces 4a and 4b and the third surfaces 5a and 5b. It should be noted that the first cutting edge 7 and the second cutting edge 8 may be continued or may be not continued. However, the first cutting edge 7 and the second cutting edge 8 have different functions, and therefore can be used independently, that is, can act independently with each other, and are preferably different in an application.

It should be noted that the cutting insert 1 has a plurality of the first cutting edges 7, and the first cutting edges include (right hand) cutting edges in the right side and (left hand) cutting edges in the left side as the cutting insert 1 is viewed from an edge tip thereof. However, the first cutting edges in the right side and the first cutting edges in the left side have a symmetry relationship, and are substantially the same. Therefore hereinafter, unless particularly mentioned, the first cutting edges will be explained regardless of whether the first cutting edge is positioned in the right side or the left side.

In addition, the cutting insert 1 has a plurality of the second cutting edges 8, and the second cutting edges include cutting edges in the right side and cutting edges in the left side as the cutting insert 1 is viewed from an edge tip thereof. However, the second cutting edges in the right side and the second cutting edges in the left side have a symmetry relationship, and are substantially the same. Therefore hereinafter, unless particularly mentioned, the second cutting edges will be explained regardless of whether the second cutting edge is positioned in the right side or the left side. It should be noted that as understandable from an explanation to be described later, there are some cases where the one second cutting edge 8 is formed to have a (right hand) cutting edge portion in the right side and a (left hand) cutting edge portion in the left side as the cutting insert 1 is viewed from an edge tip thereof.

However, the right hand first cutting edge and the left hand first cutting edge are denoted by the same reference character. Likewise, the right hand second cutting edge and the left hand second cutting edge are denoted by the same reference character. In addition, following them, a rake surface associated with the right hand cutting edge and a rake surface associated with the left hand cutting edge are denoted by the same reference character, and a relief surface associated with the right hand cutting edge and a relief surface associated with the left hand cutting edge are denoted by the same reference character. The above use of the reference characters can be also applied to the other configuration. These reference characters used in this way can assist in easy understanding of the present invention.

The first cutting edges 7 are formed such that rake surfaces (first rake surfaces) 9 associated with the first cutting edges 7 are formed on the first surfaces 2a and 2b. In the cutting insert 1, since each of the first surfaces 2a and 2b is provided with the two first cutting edges 7, each of the first surfaces 2a and 2b is provided with the two first rake surfaces 9. Accordingly the two first surfaces 2a and 2b include a total of four first rake surfaces 9. However, in each of the first surfaces 2a and 2b, one of the two first cutting edges 7 is a right hand cutting edge and the other thereof is a left hand cutting edge. Accordingly in the two first surfaces, the first cutting edges 7 and the first rake surfaces 9 are formed to be arranged to be plane-symmetrical with respect to the first median plane M1 and the second median plane M2 respectively.

The second cutting edges 8 are formed such that rake surfaces (second rake surfaces) 10 associated with the second cutting edges 8 are formed on the second surfaces 4a and 4b. In addition, the second cutting edge 8 is formed to extend to either one of the two first surfaces 2a, 2b. In the cutting insert 1, each of the second surfaces 4a and 4b is provided with the two second cutting edges 8. However, the two second cutting edges 8 in each of the second surfaces are integrated, that is, look like a continuous cutting edge, having a common portion. In the cutting insert 1, since each of the second surfaces 4a and 4b is provided with the two second cutting edges 8, each of them has two second rake surfaces 10. Similar to the two second cutting edges 8, the two second rake surfaces 10 associated with the two second cutting edges on a given second surface may be considered to be integrated. In the two second surfaces, the second cutting edges 8 and the second rake surfaces 10 are formed to be arranged to be plane-symmetrical with respect to the first median plane M1 and the second median plane M2 respectively.

However, as the two integrated second cutting edges 8 are thought to be one cutting edge, this cutting edge is formed to extend from one of the two first surfaces to the other, and can be used in any side of the two first surfaces 2a and 2b. It should be noted that the two second cutting edges 8 as integrated in this way can be understood as one cutting edge formed by extending either one of the two second cutting edges 8 from one first surface to the other first surface, and one second cutting edge alone existing from one first surface to the other first surface can be formed in each of the second surfaces. However, hereinafter, such an integrated cutting edge will be explained as having been formed of two second cutting edges.

It should be noted that the two second cutting edges 8 may be formed as two second cutting edges which are completely physically independent. In this case, the two second rake surfaces 10 can be formed independently. The cutting insert 1 is formed such that rake surfaces associated with the first cutting edge 7 and the second cutting edge 8 do not extend on the third surfaces 5a and 5b.

Figure 3:
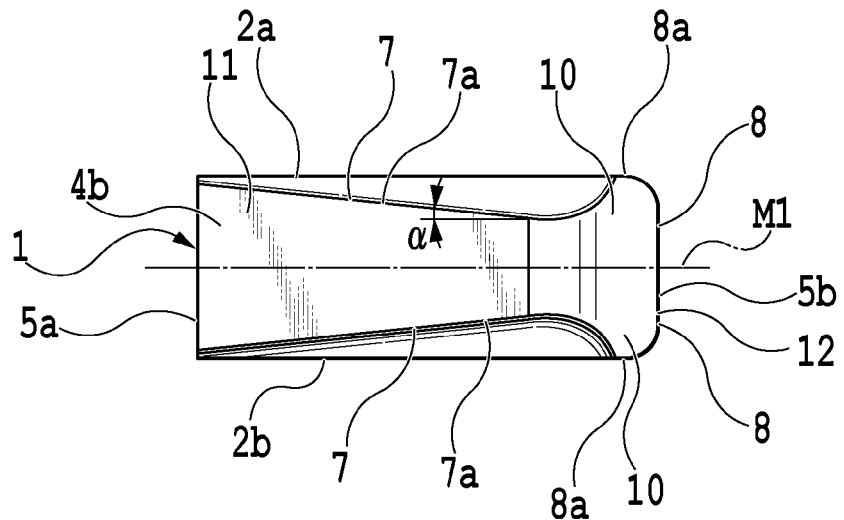
FIG. 3 is a front view of the cutting insert shown in FIG. 1.

A portion of the first surface corresponding to the first rake surface 9 is formed in a concave shape (particularly refer to FIG. 3). The concave shape of this portion of the first surfaces 2a, 2b is defined in such a manner as to make cutting performance, chip discharging characteristics or the like of the first cutting edge 7 to a desired performance. Particularly the concave shaped portion of the first surfaces 2a, 2b is defined to create a more suitable positive rake angle to the first cutting edge 7 and the first rake surface 9, and more preferably, is defined to reduce a cutting resistance. In addition, a portion of the second surface corresponding to the second rake surface 10 is also formed in a concave shape (particularly refer to FIG. 1 and FIG. 2). The concave shape of the second surface is defined in such a manner as to make cutting performance, chip discharging characteristics or the like of the second cutting edge 8 to a desired performance. Particularly the concave shaped portion of the second surface is defined to create a more suitable positive rake angle to the second cutting edge 8 and the second rake surface 10, and more preferably is defined to reduce a cutting resistance.

All the first rake surfaces 9 are formed to be shapes symmetrical to each other. All the second rake surfaces 10 are also formed to be shapes symmetrical to each other. This is because the left hand first cutting edge 7 and the right hand first cutting edge 7 are formed to be usable in the same application. Likewise, this is because the left hand second cutting edge 8 and the right hand second cutting edge 8 are formed to be usable in the same application. However, the symmetrical shape herein indicates mainly a plane-symmetrical shape. The right hand cutting edges themselves or the left hand cutting edges themselves are also rotation-symmetrical shapes.

Relief surfaces (first relief surfaces) 11 associated with the first cutting edges 7 are formed on the peripheral surface 3. In the cutting insert 1, the first cutting edge 7 is formed to extend partially along each of corner portions 2C of the first surfaces 2a and 2b. More specifically herein, the first cutting edge 7 includes two cutting edge portions 7a and 7b, and a corner extending therebetween, that is, a corner cutting edge 7c. That is, the first cutting edges 7 are formed such that the first relief surfaces 11 extend across portions of the second surfaces 4a and 4b and portions of the third surfaces 5a and 5b. However, each of the corner portions 2C is a corner of the first surface having no relation to the second cutting edge 8, while each of another corner portions 2D of the first surface has a relation to the second cutting edge 8. It should be noted that, for easy understanding in the figure, boundary lines L1 and L2 are drawn for marking the boundary of a curved portion in the peripheral surface 3 extending to a corner portion C of the cutting insert 1, but since the corner curved portion 3C of the peripheral surface 3 is smoothly connected to surface portions 3a and 3b adjacent thereto in fact, these lines do not appear. In FIG. 1 and FIG. 5, boundary lines are drawn for marking the boundary of the first relief surface 11 in each of the third surfaces 5a and 5b, but there are some cases where, since the first relief surface 11 can be smoothly connected to the periphery, these lines do not appear.

Relief surfaces (second relief surfaces) 12 associated with the second cutting edges 8 are formed mainly on the peripheral surface 3. Particularly herein, since the second cutting edge 8 is formed to extend to either one of the two first surfaces 2a, 2b and is formed to extend to or enter in around the edge of the first surface, the second relief surface 12 extends not only on the third surface, but also partially extends to the first surface. The reason for thus forming the second cutting edge 8 is that when the cutting insert 1 is mounted on a tool body to be described later, the second cutting edge 8 is used for finishing processing of a groove formed by processing using the first cutting edge 7. That is, a portion 8a of the second cutting edge 8 extending to the edge of the first surface, the edge being shared with an end portion of the second surface 4a, is formed to have a function, particularly as a flat cutting edge or wiper edge.

The first cutting edge 7 is thus formed at the intersection ridge portion between the first rake surface 9 and the first relief surface 11, and the second cutting edge 8 is thus formed at the intersection ridge portion between the second rake surface 10 and the second relief surface 12. In the cutting insert 1 in the first embodiment, the cutting edges 7 and 8 substantially shown as the intersection ridge lines between the relief surfaces 11 and 12, and the rake surfaces 9 and 10 are formed as eight edges in total. Therefore the cutting insert 1 in this embodiment includes the four first cutting edges 7 and the four second cutting edges 8, that is, a sum of eight cutting edges or cutting edge portions, can be used a sum of eight times, and is indexable.

It should be noted that the two adjacent second cutting edges 8 integrated together and extending between the two first surfaces can be used as one cutting edge, for example, for groove bottom processing. In this case, the cutting insert 1 includes a total of two integrated second cutting edges. That is, in this case, the cutting insert 1 can be understood to include the four first cutting edges 7 and the two integrated second cutting edges, and to include a sum of six cutting edges.

As in the case of the present embodiment, the second cutting edge 8 may be formed to include the flat cutting portion 8*a* when used as a cutting edge for finishing processing. A shape of the flat cutting portion 8*a* can adopt the already-known one.

As apparent from the event that the cutting insert 1 is formed to be plane-symmetrical with respect to the first median plane M1, the two first cutting edges 7 formed on one first surface and the two first cutting edges 7 formed on the other first surface are plane-symmetrical with respect to the first median plane M1.

The two second cutting edges 8 formed on one second surface are formed to be plane-symmetrical with respect to the first median plane M1. In addition, the second cutting edges 8 formed on one second surface and the second cutting edges 8 formed on the other second surface are formed to be plane-symmetrical with respect to the second median plane M2.

The first cutting edge 7 and the second cutting edge 8 formed in this way are formed not to interfere with each other. That is, when the first cutting edge 7 is used, the second cutting edge 8 is formed not to project in such a manner to interrupt an operation of the first cutting edge 7. When the second cutting edge 8 is used, the first cutting edge 7 is formed not to project in such a manner to interrupt an operation of the second cutting edge 8.

First, a shape of the first cutting edge 7 will be further explained. As a representative herein, the first cutting edge 7 (positioned in the lower part in FIG. 1) formed between the first surface 2*a* and the second surface 4*b* will be explained, but the other first cutting edge 7 is also similarly formed.

As shown in FIG. 3, the first cutting edge 7 has a substantially straight inclination portion 7*a* extending along a straight intersection ridge portion in the intersection ridge portion between the first surface 2*a* and the second surface 4*b*, a so-called inclination. The portion 7*a* of the first cutting edge 7, as shown in FIG. 3, is inclined to gradually approach the first median plane M1 as the distance from the corner 7*c* of the first cutting edge 7 increases when the cutting insert 1 is viewed from a side opposite to the second surface (refer to FIG. 3). In the present embodiment, the inclination portion 7*a* of the first cutting edge 7 is formed in a substantially straight line shape, and the inclination angle α (refer to FIG. 3) of the inclination portion 7*a* to the first median plane M1 is approximately 6°.

Preferably the inclination angle α of the inclination portion 7*a* of the first cutting edge 7 is defined within a range which is 0° or larger and which is 10° or smaller. The inclination angle α acts such that the cutting resistance is reduced when the cutting insert 1 is mounted on the rotary cutting tool capable of performing groove processing, for example. If the inclination angle α is set to a negative angle, a portion of the first cutting edge 7 most distant from the first median plane in a direction perpendicular to the first median plane M1 can be positioned either substantially same distance from the first median plane or even more distant therefrom than a portion of the second cutting edge most distant from the first median plane. In this case, at the time of using the second cutting edge 8 associated with the common first surface and second surface, the first cutting edge 7 possibly imposes an adverse effect on use of the second cutting edge 8. In reverse, if the inclination angle α exceeds 10°, as shown in FIG. 3 since a thickness of a portion in the cutting insert 1 where the two first cutting edges 7 formed in the different first surfaces 2*a* and 2*b* approach is thinner, the cutting insert 1 is liable to fracture. When the inclination angle α is within a range which is 0° or larger and which is 10° or smaller, the cutting resistance in the first cutting edge 7 is reduced and the thickness of the cutting insert 1 is kept to be appropriate, thus making it possible to prevent the first cutting edge from interrupting the operation of the second cutting edge 8. In the present embodiment, the inclination portion 7*a* in the first cutting edge 7 is formed in a substantially straight line shape, but may be formed in a curved line shape, and may be formed in a shape by a combination of a curved line and a straight line.

Here, an explanation will be further made of a relation between the first cutting edge 7 and the second cutting edge 8 in the cutting insert 1. Here, an explanation will be made of one second cutting edge 8 formed between the first surface 2*a*, the second surface 4*a*, and the third surface 5*b*. It is understood, however, that the other second cutting edges 8 are likewise configured. It should be noted that the second cutting edge 8 will be explained in a relation to the first cutting edge 7 (positioned in the upper part in FIG. 1) associated with the common second surface 4*a*, that is, formed between the first surface 2*a* and the second surface 4*a*.

A part 7*a* of the first cutting edge 7 formed between the first surface 2*a* and the second surface 4*a* extends on the straight intersection ridge portion among the intersection ridge portion between the first surface 2*a* and the second surface 4*a*. Herein a virtual plane IS is defined to (a) extend along the inclination portion 7*a* of the first cutting edge, that is, the straight intersection ridge portion between the first surface 2*a* and the second surface 4*a* and (b) be perpendicular to the first median plane M1. In this case, the second cutting edge 8 formed between the second surface 4*a* and the third surface 5*b* is formed to extend between the virtual plane IS and the second median plane M2, that is, in a space interposed therebetween (refer to FIG. 2). In other words, in the orientation seen in FIG. 2, the second cutting edge 8 (and also the second rake surface) are below the virtual plane IS, above the second median plane M2, with the second cutting edge 8 extending into the page.

Since the second cutting edge 8 is thus formed, when the first cutting edge 7 acts as a cutting edge, the second cutting edge 8 related through the second surface 4*a* to the first cutting edge 7 does not project to interrupt a function of the first cutting edge 7, thus making it possible to prevent an interference between the second cutting edge 8 and a workpiece or the like. In addition, when the first cutting edge 7 is used, this configuration can prevent damages of the second cutting edge 8 related to the common second surface.

It should be noted that the first relief surface 11 associated with the first cutting edge 7 extends on the second surface 4*a*, and, on this second surface 4*a* the second rake surface 10 associated with the second cutting edge 8 also extends. A surface portion of the second surface 4*a* corresponding to the second rake surface 10 is formed in a concave shape (concave portion), and a surface portion of the second surface 4*a* corresponding to the first relief surface 11 is formed in a substantially flat shape (flat portion). The flat portion in the second surface 4*a* is continued to the concave portion in the second surface 4a to correspond to the structure that each of the first surfaces 2a and 2b is formed in a substantially trapezoidal shape. However, the flat portion is further from the second median plane M2 than the concave portion. The above virtual plane IS is also a plane defined to substantially extend the flat portion of the second surface 4a.

With respect to the intersection ridge portion between the first surface 2a and the second surface 4a, a length of the first cutting edge 7 is longer than one-half length of the intersection ridge portion. In the present embodiment, a part of the first cutting edge 7 extends on the entire straight line portion of the intersection ridge portion. By making the length of the first cutting edge 7 in such a length, the length of the first cutting edge 7 can be made to exceed a half of a height of the trapezoid of the first surface, that is, one-half length between the third surfaces 5a and 5b. Accordingly, the first cutting edge 7 is a long cutting edge, and can be applied to cutting processing having a large cutting width. That is, the cutting insert 1 is suitable for groove processing and the like.

Figure 4:
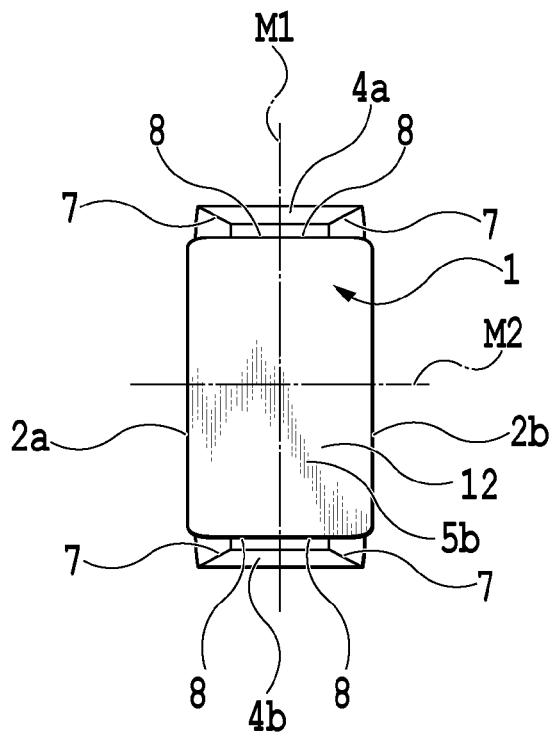
FIG. 4 is a right side view of the cutting insert shown in FIG. 1.
Figure 5:
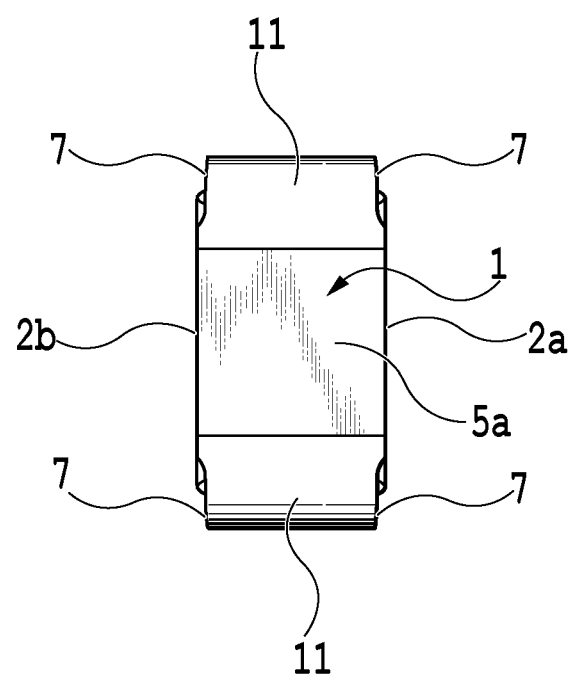
FIG. 5 is a left side view of the cutting insert shown in FIG. 1.
Figure 6:
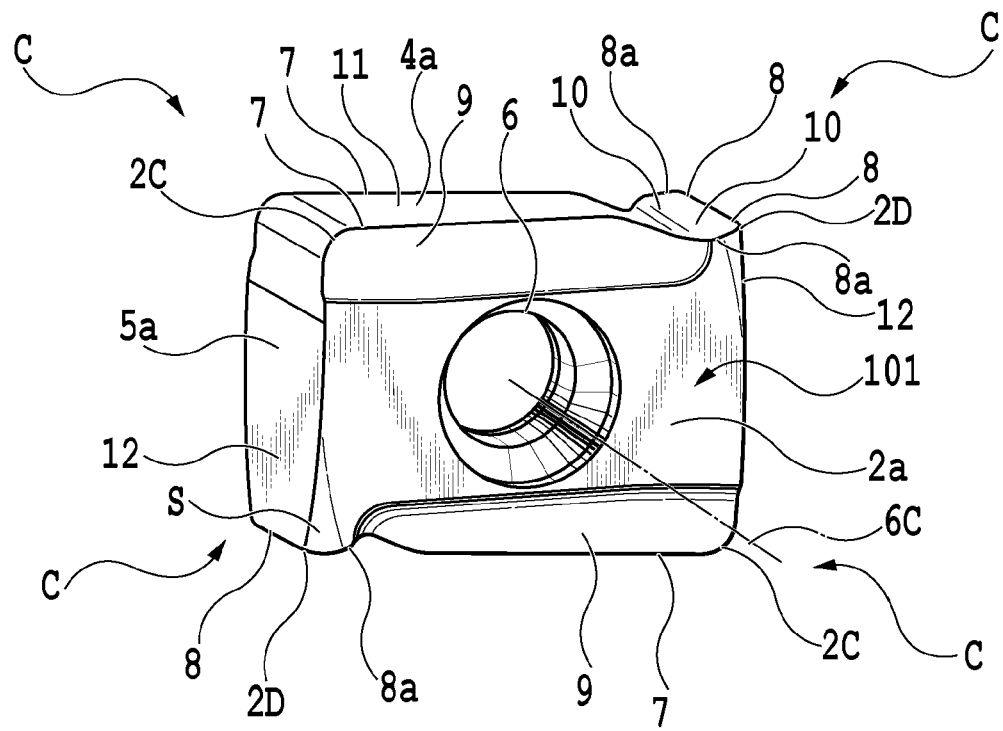
FIG. 6 is a perspective view of a cutting insert according to a second embodiment.

In a direction at a right angle to the first median plane M1, the first cutting edge 7 and the second cutting edge 8 are formed in such a manner that the portion 8a of the second cutting edge 8 the most distant from the first median plane is in a position more distant from the first median plane M1 than the corner 7c of the first cutting edge 7, that is, the portions 7a and 7c in the first cutting edge 7 extending to project to the outer edge of the insert (refer to FIG. 3 to FIG. 5). In other words, as seen in the front view of FIG. 3, the second cutting edge 8 is wider than any spacing between the two first cutting edges 7 found on opposite first surfaces. Therefore when the second cutting edge 8 formed between the first surface 2a and the second surface 4a acts as a cutting edge, the first cutting edge 7 related thereto through the common first surface 2a or second surface 4a does not project to interrupt a function of the second cutting edge 8, thus making it possible to prevent an interference between the first cutting edge 7 and a workpiece or the like. In addition, when the second cutting edge 8 is used, this configuration can prevent damage to the first cutting edge 7 related to use of the second cutting edge 8.

On the other hand, the second cutting edge 8 is, as shown in FIG. 4, mostly not inclined, and is in a substantially straight line shape formed substantially in parallel to the center axis 6C of the mounting hole 6. Therefore the cutting insert 1 can be easily manufactured. Specifically the cutting insert 1 can be produced by a general powder pressure forming and can be easily removed from a die as a metallic mold. It should be noted that the second cutting edge 8 can be formed to have an inclination portion for reducing a cutting resistance in a case where it is formed by grinding processing or the like.

Portions in the vicinity of the cutting edges 7 and 8 in the cutting insert 1 can be formed with a hard material such as cemented carbide, cermet, ceramic, cubic boron nitride and the like or by coating a surface of the hard material with a PVD or CVD coating film or can be formed by a diamond. Without mentioning, the entire cutting insert 1 may be formed with the above tool material.

A shape of the mounting hole 6 is arbitrarily adjusted such that the cutting insert 1 can be detachably mounted on the insert mounting seat of the tool body in the rotary cutting tool by using a fastening screw. In the present embodiment, the mounting hole 6 has countersink portions as abutment portions abutting on a head of the screw on both surfaces of the two first opposite surfaces 2a and 2b as opening surfaces such that the cutting insert can be reversed so that both first surfaces may be used. It should be noted that the countersink portion herein means a hole portion abutting on a seating surface of a head of a conical shape of the fastening screw or the like.

Incidentally the cutting insert 1 in the first embodiment seen in FIGS. 1-5, as described above, does not have rotation symmetry with respect to the center axis 6C of the mounting hole 6. However, in another embodiment, a cutting insert in accordance with the present invention can be configured to have rotation symmetry with respect to the center axis 6C.

Such a cutting insert 101 will be explained as a cutting insert according to a second embodiment with reference to FIG. 6 to FIG. 10. However, in the explanation of the cutting insert 101 in the second embodiment, components identical to those already explained above are referred to using the same reference characters, and an overlap explanation of these components is omitted. It should be noted that the cutting insert 101 in the second embodiment is configured to be plane-symmetrical with respect to the first median plane M1.

Figure 7:
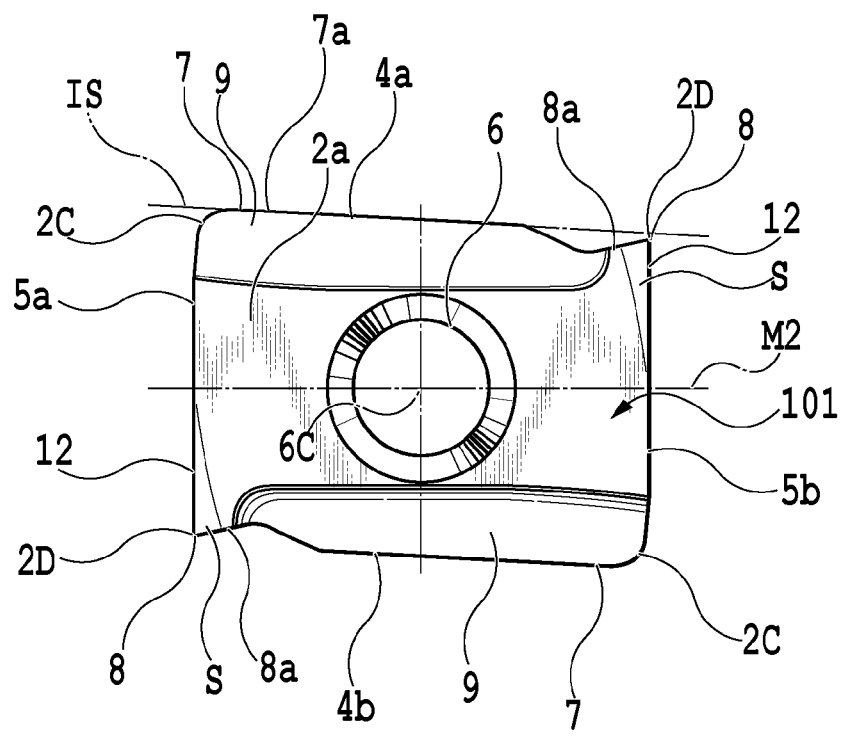
FIG. 7 is a plan view of the cutting insert shown in FIG. 6.

Unlike the cutting insert 1 of the first embodiment, the cutting insert 101 of the second embodiment is configured to have rotation symmetry of 180° around the center axis 6C of the mounting hole 6 formed to penetrate through the first surfaces 2a and 2b. Therefore each of the first surfaces 2a and 2b in the cutting insert 101 according to the second embodiment has a substantial parallelogram shape. In addition, a plurality of first cutting edges, particularly the first cutting edges associated with the common first surface are formed to have rotation symmetry around the center axis 6C. Further, as shown in FIG. 6 and FIG. 7, the second cutting edges 8 formed on the second different surfaces are positioned rotation-symmetrically around the center axis 6C of the mounting hole 6. Since the second cutting edges 8 are formed in this manner, when the second cutting edge 8 associated with the one second surface acts, the second cutting edge 8 associated with the other second surface is directed toward the tool body and can be hidden within the insert mounting seat. Therefore damage to the non-operative second cutting edge 8 can be prevented.

Since the cutting insert 101 is configured to have the rotation symmetry of 180° around the center axis 6C of the mounting hole 6, the first cutting edge 7 and the second cutting edge 8 are formed to be alternately related to four corner portions C in the cutting insert 101. That is, in each of the third surfaces 5a and 5b, the first cutting edge 7 is formed in one end side, and the second cutting edge 8 is formed in the other end side (see FIG. 9).

Figure 8:
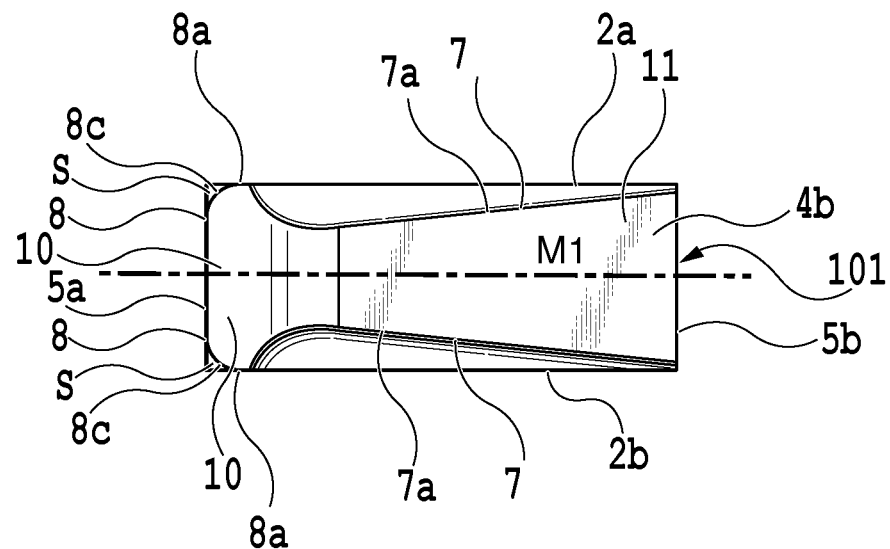
FIG. 8 is a front view of the cutting insert shown in FIG. 6.
Figure 9:
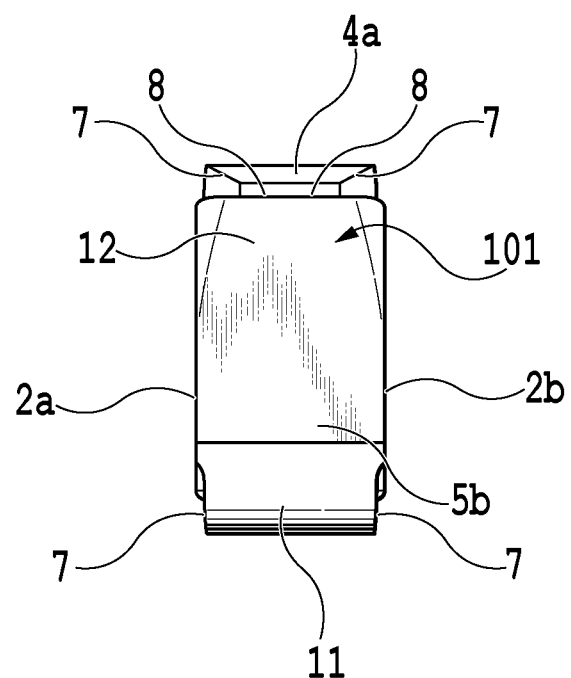
FIG. 9 is a right side view of the cutting insert shown in FIG. 6.
Figure 10:
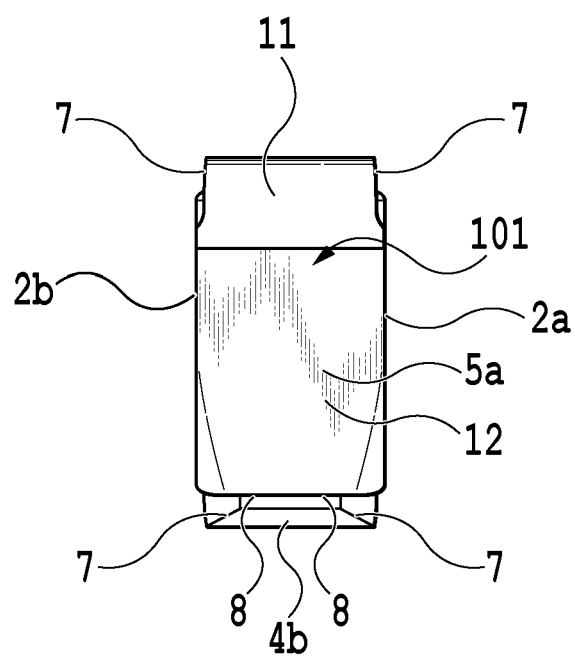
FIG. 10 is a left side view of the cutting insert shown in FIG. 6.

The second cutting edge 8 is, as shown the most clearly in FIG. 8, formed on the intersection ridge portion between the second surface and the third surface, and is mostly formed in a straight line shape. However, the second cutting edge 8 includes a flat cutting edge portion 8a, and is curved to partially extend to the edge of the first surface. A corner curved portion 8c of the second cutting edge 8 is formed such that a curvature radius changes, and the cutting insert 101 has a curved surface S corresponding thereto. The curved portion 8c of the second cutting edge 8 is formed such that the curvature radius is minimized at a peak portion, and increases with being away from the peak portion. In this way, the first cutting edge 7 and the second cutting edge 8 are configured to suitably relate with respect to the common third surface 5a, 5b. It should be noted that in the cutting insert in the first embodiment, as well as in an cutting insert in a third embodiment to be hereinafter explained, the second cutting edge 8 can be formed in this way.

Next, a cutting insert 201 according to a third embodiment will be explained with reference to FIG. 11 to FIG. 13. However, in regard to the explanation of the cutting insert 201 in the third embodiment, components identical to those already explained are referred to using the same reference characters, and an overlap explanation of these components is omitted. It should be noted that the cutting insert 201 in the third embodiment is configured to have a symmetrical shape with respect to the median plane M1 and the median plane M2, similar to the cutting insert 1 in the first embodiment described above.

A first surface of the cutting insert 201 in the third embodiment is formed in a substantially trapezoidal plate shape in the same way as the first surface of the cutting insert 1 in the first embodiment. However, in the cutting insert 201, a first rake surface 9 is formed in a simpler shape than that of the first embodiment, and portions of the first surfaces close to the first cutting edge side are substantially flat. That is, a so-called boss surface is not formed in each of the first surfaces 2a and 2b. It should be noted that the first cutting edge and the first surface may be formed to extend on a plane which is drawn in the right side in FIG. 12 to extend a narrow surface formed in a substantial pentagon. That is, the first cutting edge 7, as shown in FIG. 13, may be formed to extend substantially in parallel to the first median plane M1 without being largely inclined to the first median plane M1.

Each of the cutting inserts 1, 101, and 201 from the first to third embodiments as described above can be mounted on the insert mounting seat (insert seat) of the tool body. Here, an example of the cutting tool, in which the cutting insert 101 according to the second embodiment is used, as a representative thereof is shown in FIG. 14 to FIG. 16.

FIG. 14 to FIG. 16 show a rotary cutting tool 500 on which the plural cutting inserts 101 of the second embodiment are mounted. The cutting inserts 101 are mounted in two forms or aspects on a tool body 501 of the rotary cutting tool to be suitable for two kinds of processing. In addition, the cutting tool 500 provided with the cutting inserts 101 can perform the two kinds of processing, that is, first processing and second processing simultaneously. The first processing is processing by using the first cutting edge 7, and specifically herein, is roughing processing for forming a groove. The second processing is processing by using the second cutting edge 8, and specifically herein, is finishing processing for a side wall surface or side surface of a groove formed by using the first cutting edge 7. In this way, the cutting insert 101 has two kinds of edges used for two or more kinds of cutting processing.

The tool body 501 is formed in a substantially circular plate shape, and includes opposing or opposite end surfaces 502a and 502b, and a peripheral surface 503 extending between these end surfaces. The tool body has a hole 504 in the center to be mounted on a machine or an apparatus, and is used to be rotated in a predetermined rotation direction K around an axis 504C of the hole 504. Therefore the cutting tool 500 in which the cutting inserts 101 are mounted on the tool body 501 can form a groove on a workpiece appropriately.

Each cutting insert 101 is detachably mounted to the tool body 501 in the peripheral surface 503 by a fastening screw 505.

A plurality of first insert mounting seats 506 for mounting the cutting inserts 101 for first processing and a plurality of second insert mounting seats 507 for mounting the cutting inserts 101 for second processing are respectively formed on the tool body 501.

The first insert mounting seat 506 is formed to arrange the cutting insert 101 in such a manner that the first surface 2a or 2b having the mounting hole 6 of the cutting insert 101 faces the forward side of the tool rotational direction. Thus, in the first insert mounting seat 506, a first cutting edge 7 is operative and extends in an axial direction of tool. The first insert mounting seats 506 are composed of seats suitable for right hand first cutting edges, and seats suitable for left hand cutting edges, which open toward different end surfaces in the tool body 501. In addition, the first insert mounting seats 506 for the right hand cutting edges and the first insert mounting seats 506 for the left hand cutting edges are alternately formed in the circumferential direction on the tool body 501.

The second insert mounting seat 507 is an insert mounting seat to arrange the cutting insert 101 in such a manner as to direct the first surface 2a, 2b in the cutting insert 101 substantially at a right angle to the tool rotational direction K. Thus, in the second insert mounting seat 507, a second cutting edge 8 is operative and extends in an axial direction of tool. The second insert mounting seats 507 are also composed of two kinds of seats, one suitable for right hand second cutting edges and the other suitable for left hand second cutting edges. In addition, the second insert mounting seats 507 for the right hand cutting edges and the second insert mounting seats 507 for the left hand cutting edges are alternately formed in the circumferential direction on the tool body 501.

The first insert mounting seats 506 and the second insert mounting seats 507 are alternately formed. In this way, the insert mounting seats composed of a total of four kinds of forms are formed on the tool body 501. However, the cutting inserts used in the respective insert mounting seats 506 and 507 are made up of the same cutting inserts 101.

As described above, the first insert mounting seats 506 and the second insert mounting seats 507 are alternately staggered in the rotary cutting tool in the present embodiment. The reason for this is to disperse impact at cutting for enhancing the cutting processing performance.

When the cutting insert 101 is mounted on the first insert mounting seat 506, a first surface different from the first surface associated with the operative first cutting edge 7 is defined as a seating surface, and the second surface and the third surface not associated with this operative first cutting edge 7 are also defined as seating surfaces.

In addition, When the cutting insert 101 is mounted on the second insert mounting seat 507, a second surface different from the second surface associated with the operative second cutting edge 8 is defined as a seating surface, and the first surface and the third surface not associated with the corner portion C or the corner portion 2D of this operative second cutting edge 8 are also defined as seating surfaces. It should be noted that portions in the first surface and the second surface, which are not used as the above rake surface, are usable as seating surfaces, and particularly such a portion in the first surface is called a boss surface.

As understood from the above explanation, in a direction at a right angle to the first median plane M1, the portions 7a and 7c in the one first cutting edge 7 are formed to be closer to the first median plane than the portion of the second cutting edge 8 most distant from the first median plane M1. In addition, the second cutting edge 8 is formed to be located between the virtual plane IS and the second median plane M2. Therefore when the first cutting edge 7 is used, the second cutting edge 8 to which this first cutting edge 7 is related through the common first surface or second surface does not project so as to interrupt a function of this first cutting edge 7. Likewise, when the second cutting edge 8 is used, the first cutting edge 7 to which this second cutting edge 8 is related through the common first surface or second surface does not project so as to interrupt a function of this second cutting edge 8. In this way, the first cutting edge and the second cutting edge are related with each other and do not project unnecessarily. Therefore each of the first insert mounting seat and the second insert mounting seat does not have a complicated shape. Accordingly, this cutting tool body is superior in terms of manufacturing costs.

In the above tool body, the plurality of insert mounting seats are arranged by substantially equal intervals. However, for example, with the aim at restricting chatter vibrations, the insert mounting seats may be arranged by irregular intervals onto the tool body. For example, along the tool body peripheral surface 503, a first circumferential spacing between a first insert mounting seat 506 and an immediately adjacent second insert mounting seat 507 located in the tool rotation direction K may differ from a second circumferential spacing between that same first insert mounting seat 506 and an immediately adjacent second insert mounting seat 507 located in the direction opposite to the rotation direction K. Thus, with reference to the first insert mounting seat 506, there may be a relatively wider circumferential spacing in the tool rotation direction K and a relatively narrower circumferential spacing in the direction opposite to the tool rotation direction K. As the first insert mounting seat and the second insert mounting seat are arranged in this fashion, impacts when the cutting edges 7 and 8 make contact with a workpiece are not generated by equal intervals, making it possible to prevent inducement of the vibration having a particular frequency, and therefore there are some cases where the chatter vibration can be suppressed, depending on a cutting condition.

It should be noted that each of the cutting inserts 1 and 201 in the first and third embodiments is likewise mounted on the tool body, and the first and second processing can be similarly performed. The insert mounting seat of the tool body can be shaped to fit in the cutting insert to be used. Alternatively by interposing another member, such as a shim or cartridge, between the insert mounting seat and the cutting insert, the insert mounting seat and the cutting insert may fit with each other.

In each of the cutting inserts 1, 101 and 201, each of the first rake surface and the second rake surface is formed in a relatively simple shape. A shape of the portion including the first rake surface and/or the second rake surface is not limited to such a relatively simple shape, but may be formed in a three-dimensional complicated shape. In each of the above-described cutting inserts 1, 101 and 201, a land is not provided in a part of the relief surface, but a land may be formed thereon, if desired. The shape of the rake surface or a portion corresponding thereto may adopt various kinds of known shapes.

The cutting insert in the above embodiment can be manufactured by using the conventional manufacturing method of the cutting insert. That is, the cutting insert can be manufactured by pressure-forming the powder of a predetermined material with a powder pressure forming machine for sintering. Thereafter, grinding processing for honing or the like or surface processing work of coating or the like may be performed as needed. Since the entire peripheral surface in each of the cutting inserts 1, 101, and 201 can be formed as a plane extending at a right angle to the first median plane M1, the peripheral surface can be powder pressure-formed by a wall surface of a die using a metallic mold. The first surfaces 2a and 2b having the mounting hole 6 can be powder pressure-formed by upper and lower punches using a metallic mold. In regard to the two first surfaces 2a and 2b, since a shape of each of the upper punch and the lower punch can be transferred at the manufacturing, manufacturing costs would be modest, even if the inclination portion is provided to the cutting insert seen in the third embodiment, where there is a possibility of reducing a volume of the cutting insert, and thus reducing the manufacturing costs.

When each of the cutting inserts 1, 101, and 201 is detachably mounted on the tool body 501, the roughing processing of the groove and the finishing processing to the side surface in the groove can be simultaneously performed by the cutting tool, that is, the first cutting edge and the second cutting edge. In addition to it, in this case, since one cutting insert is provided with eight cutting edges or cutting edge portions as compared to the cutting insert in Japanese Patent Laid-Open No. 2001-38517, the running costs can be further reduced according to the present invention. Further, the cutting insert as described above is provided with two kinds of cutting edges to be capable of being adapted for two or more kinds of processing. Therefore the cutting insert according to the present invention is superior in terms of storage and inventory management, and can contribute to further reducing costs for cutting processing.

The cutting tool according to the present invention is detachably mounted on a machine tool of a machining center, for example, thereby performing a rotational movement around the tool rotational axis and a relative movement to a table on which a workpiece is placed. For example, the cutting tool according to the present invention can be used for cutting processing of a workpiece such as a steel product.

The cutting insert of the present invention including each of the aforementioned cutting inserts 1, 101, and 201 is usable even in a machine tool such as a lathe. However, when the cutting insert is mounted on the rotary cutting tool, which is mounted on a machine tool such as a machining center, the cutting insert may be more advantageous given its characteristics. Particularly in a case of simultaneously performing the groove processing and the finishing processing to the side surface of the groove, the cutting insert may be quite advantageous.

The present invention is explained by the above-mentioned embodiments, their modifications and the like with some degree of concreteness, but the present invention is not limited to the embodiments explained above. Without mentioning, it is possible to perform changes, additions and eliminations of components as needed within a scope not departing from the subject matter of the present invention. For example, the cutting insert according to the present invention may be used, not based upon an assumption of being used in one cutting tool, in cutting tools which differ for each application. In regard to the present invention, it should be understood that various kinds of improvements and changes are possible without departure from the spirit and the scope of the inventions described in claims. That is, the present invention includes all modifications and applications, and its equivalents contained in the concept of the present invention defined in claims.

What is claimed is:
1. A cutting insert shaped like a plate, comprising:
two opposite first surfaces,
a mounting hole passing through the two opposite first surfaces;
a peripheral surface extending between the two first surfaces, the peripheral surface having two opposite second surfaces,
a first cutting edge formed on an edge of one first surface of the two first surfaces, a first rake surface associated with the first cutting edge extending on the one first surface, and
a second cutting edge formed on an edge of one second surface of the two second surfaces, a second rake surface associated with the second cutting edge extending on the one second surface, wherein:

the second cutting edge has a different function from the first cutting edge.

2. The cutting insert in accordance with claim 1, wherein the first cutting edge is formed to extend along a corner portion in each of the two first surfaces, and
the second cutting edge is formed to extend to either one of the two first surfaces in each of the two second surfaces.

3. The cutting insert in accordance with claim 1, wherein
a first median plane extends medianly between the two first surfaces to substantially bisect the cutting insert,
a second median plane extends medianly between the two second surfaces to substantially bisect the cutting insert, the second median plane being perpendicular to the first median plane,
a part of the first cutting edge extends on a straight intersection ridge portion between the first surface and the second surface, and
the second cutting edge extends between the second median plane and a plane defined to be along the straight intersection ridge portion and perpendicular to the first median plane.

4. The cutting insert in accordance with claim 1, wherein
a first median plane extends medianly between the two first surfaces to substantially bisect the cutting insert, and
a portion of the second cutting edge which is most separated from the first median plane is positioned more distantly from the first median plane than a corner of the first cutting edge, in a direction perpendicular to the first median plane.

5. The cutting insert in accordance with claim 1, wherein
a length of the first cutting edge on an intersection ridge portion between the first surface and the second surface is longer than a half of a length of the intersection ridge portion between the first surface and the second surface.

6. The cutting insert in accordance with claim 1, wherein
a first median plane extends medianly between the two first surfaces to substantially bisect the cutting insert, and
the first cutting edge has a corner and a portion which extends to approach the first median plane gradually as the distance from the corner increases.

7. The cutting insert in accordance with claim 1, wherein
in one of the two second surfaces, the second cutting edge extends to one of the two first surfaces, and another second cutting edge extends to the other of the two first surfaces; and
the two second cutting edges are integrated.

8. The cutting insert in accordance with claim 1, wherein
each of the two first surfaces has a substantially quadrilateral shape,
the cutting insert has, in the peripheral surface, two opposite third surfaces in addition to the two second surfaces,
a relief surface associated with the first cutting edge extends at least on the second surface, and
a relief surface associated with the second cutting edge extends at least on the third surface.

9. The cutting insert in accordance with claim 1, wherein
a first median plane extends medianly between the two first surfaces to substantially bisect the cutting insert,
a second median plane extends medianly between the two second surfaces to substantially bisect the cutting insert, the second median plane being perpendicular to the first median plane,
a plurality of first cutting edges are formed in each of the two first surfaces,
a plurality of second cutting edges are formed in each of the two second surfaces, and
the plurality of first cutting edges are formed to have planar symmetry with respect to the first median plane and to have planar symmetry with respect to the second median plane, and
the plurality of second cutting edges are formed to have planar symmetry with respect to the first median plane and to have planar symmetry with respect to the second median plane.

10. The cutting insert in accordance with claim 1, wherein
a first median plane extends medianly between the two first surfaces to substantially bisect the cutting insert,
a first axis perpendicular to the first median plane passes through the two first surfaces,
a plurality of first cutting edges are formed in each of the two first surfaces,
a plurality of second cutting edges are formed in each of the two second surfaces, and
the plurality of first cutting edges in each first surface are formed to have rotation symmetry about the first axis and the plurality of second cutting edges are formed to have rotation symmetry about the first axis.

11. A cutting tool, comprising:
a tool body, and
an insert mounting seat formed in the tool body such that the cutting insert in accordance with claim 1 is detachably mounted on the insert mounting seat.

12. A cutting tool comprising:
a first insert mounting seat having a cutting insert in accordance with claim 1 mounted therein, wherein the first insert mounting seat is formed such that the cutting insert mounted therein is mounted to use only the first cutting edge during a cutting operation of the cutting tool, and
a second insert mounting seat having a cutting insert in accordance with claim 1 mounted therein, wherein the second insert mounting seat is formed such that the cutting insert mounted therein is mounted to use the only second cutting edge, during the same cutting operation of the tool.

13. The cutting tool in accordance with claim 12, wherein
the cutting tool is a rotary cutting tool for grooving,
the first insert mounting seat is formed such that the cutting insert is mounted to face one of the two first surfaces of the cutting insert forwardly in a rotation direction of the tool and use only the first cutting edge, and
the second insert mounting seat is formed such that the cutting insert is mounted to face one of the two first surfaces of the cutting insert toward a direction substantially perpendicular to the rotation direction of the tool and use only the second cutting edge.

14. The cutting insert in accordance with claim 1, wherein:
the second cutting edge extends to the one first surface.

15. A cutting insert shaped like a plate, comprising:
two opposite first surfaces,
a peripheral surface extending between the two first surfaces, the peripheral surface having two opposite second surfaces, and two opposite third surfaces,
a first median plane extending medianly between the two first surfaces to substantially bisect the cutting insert,
a second median plane extending medianly between the two second surfaces to substantially bisect the cutting insert, the second median plane being perpendicular to the first median plane,
a first axis perpendicular to the first median plane and passing through the two first surfaces,
a first cutting edge formed on an edge formed between one of the two first surfaces and one of the two second surfaces, a first rake surface associated with the first cutting edge extending on said one of the two first surfaces, and a second cutting edge formed on an edge formed between said one of the two second surfaces and one of the two third surfaces, a second rake surface associated with the second cutting edge extending on said one of the two second surfaces, wherein in a plan view of said one first surface along said first axis:

the first cutting edge has an inclination portion which is inclined towards the second median plane as the inclination portion of the first cutting edge extends towards said one of the two third surfaces;

a virtual plane (IS) extends along the inclination portion of the first cutting edge; and the second cutting edge and the second rake surface are between the virtual plane (IS) and the second median plane.

16. A cutting tool comprising:

a first insert mounting seat having a cutting insert in accordance with claim 15 mounted therein, wherein the first mounting seat is formed such that the cutting insert mounted therein is mounted to use only the first cutting edge during a cutting operation of the cutting tool, and a second insert mounting seat having a cutting insert in accordance with claim 14 mounted therein, wherein the second seat is formed such that the cutting insert mounted therein is mounted to use the only second cutting edge, during the same cutting operation of the tool.

17. A cutting insert shaped like a plate, comprising:

two opposite first surfaces, a peripheral surface extending between the two first surfaces, the peripheral surface having two opposite second surfaces, a first cutting edge formed on an edge of one first surface of the two first surfaces, a first rake surface associated with the first cutting edge extending on the one first surface, and a second cutting edge formed on an edge of one second surface of the two second surfaces, a second rake surface associated with the second cutting edge extending on the one second surface, wherein:

a first median plane extends medianly between the two first surfaces to substantially bisect the cutting insert;

the first cutting edge has a corner remote from the second cutting edge and in a view of said one second surface, has a portion which extends to approach the first median plane gradually as the distance from the corner increases; and the second cutting edge has a different function from the first cutting edge.

* * * * *